United States Patent [19]
Akiyama et al.

[11] Patent Number: 4,495,767
[45] Date of Patent: Jan. 29, 1985

[54] ANTICAVITATION CONTROL SYSTEM FOR A HYDROSTATIC TRANSMISSION

[75] Inventors: Teruo Akiyama, Yokohama; Koichi Morita, Kamakura, both of Japan

[73] Assignee: Kabushiki Kaisha Komatsu Seisakusho, Tokyo, Japan

[21] Appl. No.: 445,533

[22] Filed: Nov. 30, 1982

[30] Foreign Application Priority Data

Nov. 30, 1981 [JP] Japan ................. 56-190911

[51] Int. Cl.$^3$ ............................. F16D 31/02
[52] U.S. Cl. ........................ 60/436; 60/435; 60/442; 60/444; 60/468; 192/4 A; 192/3 R
[58] Field of Search ............... 60/435, 436, 442, 444, 60/468; 91/44; 180/307; 192/4 A, 3 N, 3 R, 1

[56] References Cited

U.S. PATENT DOCUMENTS 3,759,357  9/1973  Bianchetta ................ 192/3 R
4,317,331  3/1982  Aruga et al. ............... 60/436

Primary Examiner—Sheldon J. Richter
Assistant Examiner—Randolph A. Smith
Attorney, Agent, or Firm—Armstrong, Nikaido, Marmelstein & Kubovcik

[57] ABSTRACT

A hydrostatic transmission has an engine-driven, bidirectional, variable-displacement drive pump connected in circuit with a bidirectional, variable-displacement propelling motor. A charging pump is also connected to the circuit of the drive pump and the propelling motor. A brake assembly normally locks the output shaft of the propelling motor against rotation and releases same only while being supplied with a hydraulic brake release signal. The control system for the hydrostatic transmission comprises a speed control valve actuated manually to deliver fluid pressure signals to servo controls for adjusting the outputs from the drive pump and the propelling motor, and a brake control valve pilot-operated to deliver the brake release signal to the brake assembly. Also included are a charge sensor valve and a speed control sensor valve. The two sensor valves cooperate to cause the output from the charging pump to pilot-actuate the brake control valve, for the delivery of the brake release signal, only when the charging pump output pressure rises to a predetermined level and, simultaneously, when the speed control valve is being manipulated. Whenever the charging pump output pressure falls below the predetermined level, the sensor valves cause the brake control valve to terminate the production of the brake release signal and to drain the signal output ports of the speed control valve, thereby causing the transmission to stop the vehicle and so avoiding cavitation in the drive pump and the propelling motor.

4 Claims, 1 Drawing Figure

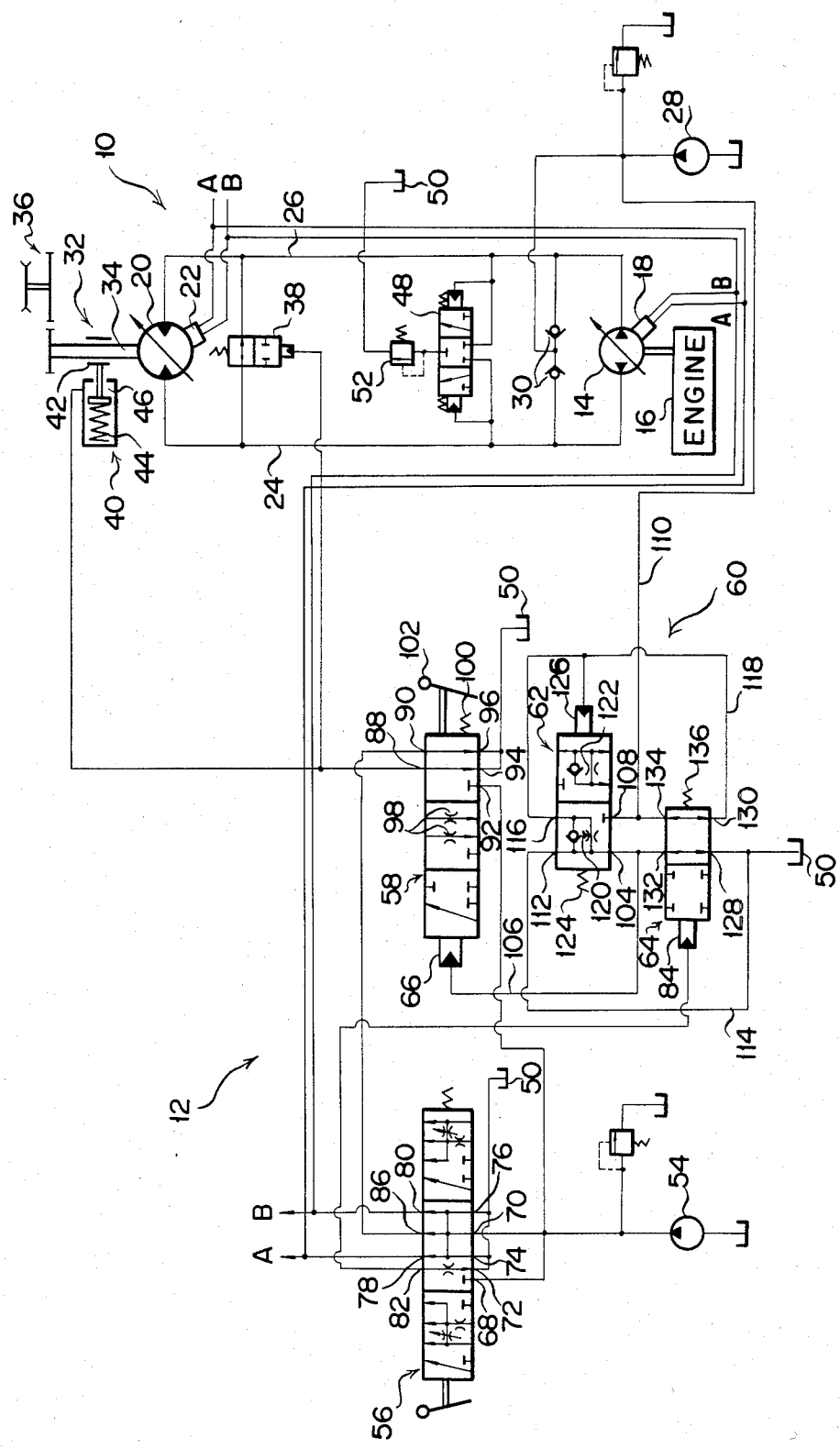

ANTICAVITATION CONTROL SYSTEM FOR A HYDROSTATIC TRANSMISSION

BACKGROUND OF THE INVENTION

Our invention deals with hydraulic control systems, and is directed more particularly to one for a hydrostatic transmission for vehicles.

As is well known, vehicles such as some off-highway work vehicles incorporate hydrostatic transmissions wherein a bidirectional, variable-displacement drive pump is connected in fluid circuit with a bidirectional, variable-displacement propelling motor for driving same. A charging pump is also connected to this circuit for supplying positive pressure required. A problem with this type of vehicular transmission is the almost unavoidable oil leakage from the drive pump and the propelling motor during the operation of the vehicle. As the charging pump becomes unable to compensate for such leakage, localized gaseous conditions in the liquid stream, known as cavitation, will develop in the drive pump and the propelling motor. Cavitation presents a serious hazard to these hydraulic units, possibly destroying them unless the vehicle is stopped immediately.

SUMMARY OF THE INVENTION

In making this invention, therefore, we have sought to protect the noted components of a hydrostatic transmission against damage due to cavitation by automatically stopping the vehicle upon decrease in the output from the charging pump. We have also sought to make possible the safe restarting of the vehicle after the charging pump output has built up to a normal level.

In broad outline we contemplate the provision of a control system for a hydrostatic transmission of the type including a bidirectional, variable-displacement drive pump, a bidirectional, variable-displacement propelling motor connected in circuit with the drive pump to be driven thereby, and a charging pump also connected to the circuit. Both drive pump and propelling motor have servo controls for adjustably varying the outputs therefrom. Also included is a brake assembly provided to the output shaft of the propelling motor for normally locking same against rotation in either direction. The brake assembly releases the motor output shaft only while being supplied with a hydraulic brake release signal.

The control system for the hydrostatic transmission, in accordance with our invention, comprises a speed control valve actuated manually for controlling the outputs from the drive pump and the propelling motor by directing fluid signals to the servo controls, and a brake control valve for the engagement and disengagement of the brake assembly on the propelling motor output shaft. Normally held in a first position for allowing the brake assembly to lock the propelling motor output shaft against rotation, the brake control valve is pilot actuated from the first toward a second position for delivering the brake release signal to the brake assembly. The brake control valve is further adapted to prevent the speed control valve from applying the fluid signals to the servo controls when the brake control valve is in the first position, that is, when the propelling motor output shaft is engaged by the brake assembly. The control system also includes sensor valve means for permitting the brake control valve to be pilot actuated from the first toward the second position by the output from the charging pump when its pressure builds up to or past a predetermined level and, at the same time, when the speed control valve is being actuated manually for signal application to the servo controls. Whenever the output pressure of the charging pump drops below the predetermined level, the sensor valve means cause the brake control valve to return to the first position.

Thus, when leakage from the drive pump and the propelling motor increases inordinately, as manifested by a drop in the output pressure of the charging pump, the control system of our invention automatically stops the vehicle regardless of the working position of the speed control valve. With the vehicle thus stopped immediately, the drive pump and the propelling motor are protected from damage due to cavitation.

In a preferred embodiment the operator is required to temporarily return the speed control valve to neutral for restarting the vehicle after the output from the charging pump has regained its normal pressure. The temporary neutralization of the speed control valve is intended to leave the restarting of the vehicle to the operator's discretion, rather than to allow the control system to automatically restart the vehicle, as the latter scheme might invite cavitation again.

The above and other features and advantages of our invention and the manner of attaining them will become more apparent, and the invention itself will best be understood, from the following description of the preferred embodiment taken together with the attached drawing.

BRIEF DESCRIPTION OF THE DRAWING

The Drawing is a schematic illustration of a preferred form of the hydrostatic transmission control system embodying the principles of our invention.

DESCRIPTION OF THE PREFERRED EMBODIMENT

In the Drawing the reference numeral 10 generally designates a typical hydrostatic transmission for an off-highway self-propelled work machine, to be controlled by a hydraulic control system 12. The hydrostatic transmission 10 broadly comprises:

1. A hydraulic, bidirectional, variable-displacement drive pump 14 driven by a suitable prime mover such as an internal combustion engine 16 and controlled by a first servo control 18.

2. A hydraulic, bidirectional, variable-displacement propelling motor 20, under the control of a second servo control 22, connected in circuit with the drive pump 14 via supply conduits 24 and 26 to be driven thereby.

3. A charging pump 28 connected to the supply conduits 24 and 26 via respective check valves 30.

4. A brake assembly 32 provided to the output shaft 34 of the propelling motor 20 which is coupled to the familiar propelling system of the vehicle generally referenced 36.

5. A pilot-operated bypass valve 38 connected in parallel with the propelling motor 20.

Each of the first 18 and second 22 servo controls for the pump and the motor has two inputs for receiving hydraulic servo control signals A and B from the control system 12, as will be detailed subsequently. Receiving these signals, the servo controls 18 and 22 control the per-cycle displacement and flow direction of the drive pump 14 and the propelling motor 20 in the manner well known to the specialists.

The brake assembly 32 includes a hydraulic cylinder 40 of the single-acting, spring-return type having its piston rod coupled to a brake 42 on the propelling motor output shaft 34. A spring 44 in the cylinder 40 normally causes the brake 42 to engage and lock the propelling motor output shaft 34 against rotation in either direction. Only when being supplied with a hydraulic brake release signal into its fluid chamber 46 from the control system 12, the cylinder 40 causes the brake 42 to release the propelling motor output shaft 34.

The bypass valve 38 serves a purpose similar to that of the brake assembly 32, normally held in the illustrated open position under spring pressure to provide a bypass around the propelling motor 20 for the output fluid from the drive pump 14. When pilot actuated from the control system 12, the bypass valve 38 shifts to its closed position against the bias of the spring to allow the drive pump 14 to power the propelling motor 20. It is thus seen that this motor can propel the vehicle only when both brake assembly 32 and bypass valve 38 are being actuated hydraulically.

The illustrated hydrostatic transmission 10 further includes a shuttle valve 48 connected between the pair of supply conduits 24 and 26. The shuttle valve 48 leads to a reservoir or sump 50 via a relief valve 52.

We will now proceed to the detailed description of the hydraulic control system 12 for the hydrostatic transmission 10 of the foregoing configuration. The principal components of the control system 12 are:

1. A control pump 54.

2. A speed control valve 56 actuated manually for delivering the servo control signals A and B from the control pump 54 to the first 18 and second 22 servo controls of the hydrostatic transmission 10.

3. A brake control valve 58 pilot-actuated to deliver the brake release signal to the brake assembly 32, and a pilot signal to the bypass valve 38, from the control pump 54, the brake control valve being further effective to cancel or invalidate the servo control output signals A and B of the speed control valve 56 when in its normal position.

4. Sensor valve means 60 comprising a charge sensor valve 62 and a speed control sensor valve 64 for selectively placing a pilot actuator 66 of the brake control valve 58 in communication with the charging pump 28 and with the fluid drain in response to the output from the charging pump and, via the speed control valve 56, to the output from the control pump 54.

The speed control valve 56 is a three-position, normally centered valve having, on one side, first 68 and second 70 pump ports in communication with the control pump 54 and three drain ports 72, 74 and 76 in communication with the sump 50. Provided on the other side of the speed control valve 56 are first 78 and second 80 servo control ports in communication with the servo controls 18 and 22 for the drive pump 14 and propelling motor 20 of the hydrostatic transmission 10, a pilot port 82 in communication with a pilot actuator 84 of the speed control sensor valve 64, and a drain port 86 to be selectively placed in and out of communication with the sump 50 by the brake control valve 58.

The three positions of the speed control valve 56 are:

1. A neutral position where the first pump port 68 is closed, and the second pump port 70, servo control ports 78 and 80, pilot port 82 and drain port 86 are all placed in direct communication with the sump 50.

2. A right hand offset position where the first pump port 68 communicates with the pilot port 82, the second pump port 70 communicates with the first servo control port 78 and with the drain port 86, and the second servo control port 80 communicates with the sump 50 via the drain port 76.

3. A left hand offset position where the first pump port 68 communicates with the pilot port 82, the second pump port 70 communicates with the second servo control port 80 and with the drain port 86, and the first servo control port 78 communicates with the sump 50 via the drain port 72.

The pilot-operated brake control valve 58 is shown also as a three-position valve. Provided on one side of this brake control valve are a brake port 88 in communication with the fluid chamber 46 of the brake cylinder 40 and with the pilot actuator of the by-pass valve 38, and an inlet port 90 in communication with the drain port 86 of the speed control valve 56. On the other side of the brake control valve 58 there are a pump port 92 in communication with the control pump 54, and first 94 and second 96 drain ports in communication with the sump 50.

The brake control valve 58 has the following three positions:

1. A normal or right hand position where the brake port 88 and inlet port 90 communicate with the drain ports 94 and 96, and the pump port 92 is closed.

2. An intermediate position where the brake port 88 and inlet port 90 communicate with the drain ports 94 and 96 via restrictions 98, and the pump port 92 remains closed.

3. A left hand position where the pump port 92 communicates with the brake port 88, and all the other ports 90, 94 and 96 are closed.

Normally held in the right hand position by the force of a spring 100, the brake control valve 58 travels to the left hand position upon reception of a pilot pressure signal to its pilot actuator 66 from the sensor valve means 60. The brake control valve 58 is additionally provided with a lever 102 for manual activation as required.

It will have been seen that, when in its normal position, the brake control valve 58 places the brake cylinder 40 and the pilot actuator of the bypass valve 38 in communication with the fluid drain. The hydrostatic transmission 10 is then incapable of propelling the vehicle even if the drive pump 14 is in operation. Also, when the brake control valve 58 is in the normal position, the drain port 86 of the speed control valve 56 communicates with the sump 50 via the ports 90 and 96 of the brake control valve, so that the speed control valve is incapable of delivering the servo control signals A and B to the servo controls 18 and 22. On being pilot actuated to the left hand position, the brake control valve 58 delivers the pressurized fluid from the control pump 54 to the brake cylinder 40 and to the pilot actuator of the bypass valve 38. The hydrostatic transmission 10 is now in condition for propelling the vehicle. The brake control valve 58 when in the left hand position also blocks the inlet port 90, so that the speed control valve 56 on actuation can deliver the servo control signals A and B to the servo controls 18 and 22.

Provided for automatically pilot operating the brake control valve 58 are the sensor valve means 60 comprising the charge sensor valve 62 and the speed control sensor valve 64. The two sensor valves 62 and 64 operate conjointly in response to the output from the charging pump 28 and, via the ports 68 and 82 of the speed control valve 56, to the output from the control pump 54.

The charge sensor valve 62 is a four-port, two-position, pilot-operated valve. Provided on one side of the charge sensor valve are a pilot port 104 in communication with the pilot actuator 66 of the brake control valve 58 by way of a pilot conduit 106, and a pump port 108 in communication with the charging pump 28 by way of a conduit 110. On the other side of the charge sensor valve 62 there are a drain port 112 in communication with the sump 50 by way of a drain conduit 114, and a port 116 in communication with the speed control sensor valve 64 by way of a conduit 118.

The two positions of the charge sensor valve 62 are:
1. A normal or left hand position where the pilot port 104 communicates with the drain port 112, the pump port 108 is closed, and the port 116 communicates with the drain port 112 via a restriction 120.
2. A right hand position where the pilot port 104 communicates with the pump port 108 and port 116 via a restriction 122, the pump port 108 communicates with the port 116, and the drain port 112 is closed.

A spring 124 at one end of the charge sensor valve 62 normally holds this valve in the left hand position. At its opposite end the chrge sensor valve 62 has a pilot actuator 126 which is connected to the conduit 118. Upon pressurization of this pilot actuator from the charging pump 28 the charge sensor valve 62 is shifted to the right hand position against the force of the spring 124.

The speed control sensor valve 64 is also of the four-port, two-position, pilot-operated type. It has on one side a drain port 128 in communication with the sump 50, and an outlet port 130 in communication with the port 116 of the charge sensor valve 62 by way of the conduit 118. On the other side of the speed control sensor valve 64 there are provided an inlet port 132 in communication with the pilot port 104 of the charge sensor valve 62, and a pump port 134 in communication with the charging pump 28 by way of the conduit 110.

Under the bias of a spring 136 the speed control sensor valve 64 normally stays in the right hand position, holding the inlet port 132 in communication with the drain port 128, and the pump port 134 in communication with the outlet port 130. When pilot actuated to the left hand position by the output from the control pump 54 via the speed control valve 56, the speed control sensor valve 64 blocks all the ports 128, 130, 132 and 134.

OPERATION

The Drawing illustrates both the hydrostatic transmission 10 and its control system 12 on the assumption that the vehicle engine 16 is out of operation. Th various valves of the control system 12 are of course in their normal positions, as shown, and the brake cylinder 40 of the brake assembly 32 is held extended under the force of the spring 44, causing the brake 42 to engage and lock the output shaft 34 of the propelling motor 30 against rotation in either direction. The bypass valve 38 lies in the open position under spring pressure.

The engine 16 is first set into operation for starting up the vehicle. Thereupon the pressurized fluid from the charging pump 28 flows into the port 116 of the charge sensor valve 62 by way of the conduit 110, the ports 134 and 130 of the speed control sensor valve 64, and the conduit 118. As the pressurized fluid traverses the charge sensor valve 62 in its left hand position, the restriction 120 therein maintains the fluid pressure on its downstream side to such an extent as to permit the fluid pressure in the conduit 118 to pilot-actuate the charge sensor valve to the right hand position against the force of the spring 124. Now the pressurized fluid from the charging pump 28 starts flowing through the restriction 122 in the charge sensor valve 62 and emerges from its pilot port 104 leading to the pilot actuator 66 of the brake control valve 58.

However, the shifting of the charge sensor valve 62 to the right hand position does not immediately result in the activation of the brake control valve 58 away from its normal position. The speed control valve 56 is now assumed to be in neutral. Consequently the pilot actuator 84 of the speed control sensor valve 64 communicates with the sump 50 via the ports 82 and 72 of the speed control valve 56, so that the speed control sensor valve still remains in its normal position under the bias of the spring 136. The speed control sensor valve 64 when in this normal position communicates the pilot port 104 of the charge sensor valve 62, and the pilot actuator 66 of the brake control valve 58, with the sump 50 via the ports 132 and 128. Thus the brake control valve 58 also remains normal under the bias of the spring 100. The brake control valve 58 when in its normal position holds the brake port 88 in communication with the drain port 94 leading to the sump 50. Accordingly the brake 42 of the brake assembly 32 is held applied, and the pilot-operated bypass valve 38 held open.

It is seen from the foregoing that the hydrostatic transmission 10 remains inoperative even after the vehicle engine 16 has been set into operation with the consequent actuation of the charge sensor valve 62 to its right hand position. Therefore, even if the per-cycle displacements of the drive pump 14 and the propelling motor 20 are not exactly zero at this time, the vehicle will not "creep" as long as the speed control valve 56 remains in neutral, blocking the pilot actuator 84 of the speed control sensor valve 64 from the control pump 54.

For starting up the vehicle the operator may actuate the speed control valve 56 in either direction from its neutral position. When shifted to either of its offset positions, the speed control valve 56 places the control pump 54 in communication with the pilot actuator 84 of the speed control sensor valve 64 via the ports 68 and 82. Thus pilot actuated, the speed control sensor valve 64 travels to its left hand closed position against the force of the spring 136. Thereupon the pilot port 104 of the charge sensor valve 62 in its right hand position becomes discommunicated from the sump 50. Now the brake control valve 58 is pilot actuated to its left hand position against the force of the spring 100 from the charging pump 28 via the charge sensor valve 62.

In this left hand position the brake control valve 58 communicates the pump port 92 with the brake port 88. The pressurized fluid from the control pump 54 is therefore directed by the brake control valve 58 toward the brake cylinder 40 as the brake release signal and toward the bypass valve 38 as the pilot signal. With the consequent contraction of the brake cylinder 40 the brake 42 releases the output shaft 34 of the propelling motor 20 to allow its rotation. The bypass valve 38, on the other hand, is pilot actuated to its closed position against the bias of the spring to permit the propelling motor 20 to be driven by the drive pump 14.

Also, on being pilot actuated to its left hand position as above, the brake control valve 58 blocks the inlet port 90 leading to the drain port 86 of the speed control valve 56. The result is the production of the servo control signal A or B from either of the servo control ports 78 and 80 of the speed control valve 56. Having a pressure depending upon the degree of displacement of the speed control valve 56 from its neutral position, the servo control signal is applied to the servo controls 18 and 22 to cause same to control the outputs from the drive pump 14 and the propelling motor 20. Thus the vehicle starts travelling at a desired speed and in a desired direction.

If leakage from the drive pump 14 and the propelling motor 20 increases during the operation of the vehicle, the correspondingly greater fluid flow is required from the charging pump 28. In the event of an undue drop in the output pressure of the charging pump, cavitation would take place in the drive pump 14 and the propelling motor 20, possibly destroying these hydraulic components. It is therefore imperative that the vehicle be stopped immediately when the output pressure of the charging drops below a predetermined safe level, for the early elimination of the cause for such pressure drop. The control system 12 of our invention has provisions for automatically stopping the vehicle in response to a drop in the output pressure of the charging pump. We will discuss this operational feature of the control system 12 in the subsequent paragraphs.

As the output pressure of the charging pump 28 decreases, so does the pilot pressure acting on the pilot actuator 126 of the charge sensor valve 62. This decrease in the pilot pressure allows the charge sensor valve 62 to return to the normal left hand position under the bias of the spring 124. Thereupon the pilot actuator 66 of the brake control valve 58 becomes communicated with the sump 50 by way of the pilot port 104 and drain port 112 of the charge sensor valve 62 and the drain conduit 114. (The speed control sensor valve 64 is now in the left hand closed position.) The result is the return of the brake control valve 58 to the normal right hand position under the bias of the spring 100.

On return to its normal position the brake control valve 58 drains the brake cylinder 40 and the pilot actuator of the bypass valve 38. The brake cylinder 40 extends under spring pressure to cause the brake 42 to arrest the rotation of the output shaft 34 of the propelling motor 22. The bypass valve 38, on the other hand, returns to its normal open position under spring pressure, causing the working fluid to bypass the propelling motor 22. The brake control valve 58 in its normal position also places the drain port 86 of the speed control valve 56 in communication with the sump 50 via the inlet port 90 and second drain port 96. This invalidates, so to say, the servo control signal that has been delivered from the speed control valve to the servo controls 18 and 22 of the drive pump 14 and the propelling motor 20.

Thus the vehicle automatically comes to a standstill upon decrease in the output pressure of the charging pump 28. It will be noted that, of the four primary valves of the control system 12, only the brake control valve 58 and the charge sensor valve 62 have automatically returned to their normal positions for automatically stopping the vehicle. The speed control valve 56 still lies in either of its two offset positions, and the speed control sensor valve 64 in its left hand closed position.

As the drive pump 14 and the propelling motor 20 are both relieved of their loads by stopping the vehicle as above, leakage will decrease, and the output from the charging pump 28 will regain its normal pressure level. The vehicle may therefore be restarted as by lessening or removing the load on its implement assembly or by choosing a track of smaller travelling resistance.

However, the control system 12 of our invention does not allow the automatic restarting of the vehicle even if the output pressure of the charging pump returns to its normal level. Since the speed control sensor valve 64 is now in its left hand closed position as aforesaid, the output from the charging pump 28 is thereby blocked and is so incapable of pilot-actuating the charge sensor valve 62. As the charge sensor valve thus remains in its normal position, so does the brake control valve 58.

In restarting the vehicle, therefore, the operator should make sure that cavitation will not take place, and temporarily return the speed control valve 56 to neutral at his own discretion. The neutralization of the speed control valve 56 results in the communication of the pilot actuator 84 of the speed control sensor valve 64 with the sump 50 and, as a consequence, in the return of this sensor valve to its right hand open position. Thereupon the charge sensor valve 62 becomes pilot actuated from the charging pump 28 and shifts to its right hand position against the force of the spring 124. The subsequent manipulation of the speed control valve 56 in either direction sets the vehicle into motion in the manner set forth previously.

As has been stated, the brake control valve 58 is provided with the lever 102 for manual actuation. The vehicle can be braked as required by the manual actuation of this lever.

While we have herein shown and described our invention in terms of but one embodiment thereof, we understand that it is illustrative only and not to be taken as a definition of the scope of the invention, reference being had for this purpose to the appended claims.

We claim:

1. In a hydrostatic transmission of the type including a hydraulic, bidirectional, variable-displacement drive pump having a first servo control for controlling the output thereof, a hydraulic, bidirectional, variable-displacement propelling motor having a second servo control for controlling the output thereof and and connected in circuit with the drive pump to be driven thereby, a charging pump connected to the circuit of the drive pump and the propelling motor, and a brake assembly provided to an output shaft of the propelling motor for normally locking same against rotation, the brake assembly being adapted to release the output shaft of the propelling motor only while being supplied with a hydraulic brake release, a control system comprising:

(a) a control pump;
(b) a speed control valve actuated manually for delivering servo control signals, derived from the control pump, to the first and second servo controls to cause same to control the outputs from the drive pump and the propelling motor;
(c) a brake control valve normally held in a first position for allowing the brake assembly to lock the output shaft of the propelling motor against rotation, the brake control valve being pilot actuated from the first to a second position for delivering the brake release signal, derived from the control pump, to the brake assembly, the brake control valve further providing a fluid connection from the speed control valve to a reservoir to prevent the speed control valve from putting out the servo control signals when the brake control valve is in the first position; and (d) sensor valve means for allowing the output from the charging pump to pilot-actuate the brake control valve from the first to the second position only when the charging pump output pressure rises to a predetermined level and, at the same time, when the speed control valve is being actuated manually and for causing the brake control valve to return to the first position regardless of the position of the speed control valve when the charging pump output pressure falls below the predetermined level.

2. A hydrostatic transmission control system as recited in claim 1, wherein the sensor valve means comprises:

(a) a charge sensor valve normally holding a pilot actuator of the brake control valve in communication with a fluid drain in order to maintain the brake control valve in the first position, the charge sensor valve being pilot actuated from the charging pump, when the output pressure thereof rises to the predetermined level, to direct the charging pump output toward the pilot actuator of the brake control valve; and (b) a speed control sensor valve interposed between the charge sensor valve and the pilot actuator of the brake control valve, the speed control sensor valve being normally held in a third position for placing the pilot actuator of the brake control valve in communication with the fluid drain, the speed control sensor valve being pilot actuated from the speed control valve, when the latter is being actuated manually, to a fourth position for placing the pilot actuator of the brake control valve out of communication with the fluid drain and in communication with the charge sensor valve.

3. A hydrostatic transmission control system as recited in claim 2, wherein the speed control sensor valve further has means for allowing the charge sensor valve to be pilot actuated from the charging pump only when the speed control sensor valve is in the third position.

4. A hydrostatic transmission control system as recited in claim 1, wherein the brake control valve further has means for manual actuation.

* * * * *